United States Patent [19]
Flick et al.

[11] Patent Number: 6,099,951
[45] Date of Patent: Aug. 8, 2000

[54] GELATINOUS COMPOSITE ARTICLE AND CONSTRUCTION

[75] Inventors: Roland E. Flick, Elma; Joel T. Jusiak, Boston, both of N.Y.

[73] Assignee: Gaymar Industries, Inc., Orchard Park, N.Y.

[21] Appl. No.: 09/120,640

[22] Filed: Jul. 22, 1998

[51] Int. Cl.$^7$ ........................................ B32B 3/06
[52] U.S. Cl. ............... 428/306.6; 442/150; 442/398; 442/399; 442/37; 442/41; 428/304.4
[58] Field of Search ..................... 442/150, 398, 442/399, 37, 41; 428/306.6, 304.4

[56] References Cited

U.S. PATENT DOCUMENTS

| | | |
|---|---|---|
| 4,369,284 | 1/1983 | Chen ........................................ 524/476 |
| 4,618,213 | 10/1986 | Chen .................................... 350/96.34 |
| 5,152,021 | 10/1992 | Vrzalik ........................................ 5/455 |
| 5,216,768 | 6/1993 | Bodine et al. ............................... 5/453 |
| 5,262,468 | 11/1993 | Chen ........................................ 524/476 |
| 5,297,553 | 3/1994 | Sliwa, Jr. et al. ................. 128/662.03 |
| 5,334,646 | 8/1994 | Chen ........................................ 524/474 |
| 5,336,708 | 8/1994 | Chen ........................................ 524/474 |
| 5,487,196 | 1/1996 | Wilkinson et al. ........................... 5/453 |
| 5,508,334 | 4/1996 | Chen ........................................ 524/474 |
| 5,542,136 | 8/1996 | Tappel .......................................... 5/710 |
| 5,586,346 | 12/1996 | Stacy et al. .................................. 5/710 |
| 5,634,225 | 6/1997 | Miller, Sr. et al. .......................... 5/710 |
| 5,794,289 | 8/1998 | Wortmann et al. .......................... 5/713 |
| 5,905,638 | 5/1999 | MacDonald et al. .................... 361/769 |

OTHER PUBLICATIONS

Gove (Editor–in–Chief) et al., *Webster's Third New International Dictionary of the English Language Unabridged*, G.&C. Merriam Company, 1966, cover page and p. 1456.

*Primary Examiner*—Terrel Morris
*Assistant Examiner*—Arti R. Singh
*Attorney, Agent, or Firm*—Hodgson, Russ, Andrews, Woods & Goodyear LLP

[57] ABSTRACT

A gelatinous composite article has a sealant layer, a permeable layer and a heat formable and heat reversible gelatinous elastomer material. The sealant layer melts within a first temperature range. The permeable layer is over the sealant layer and melts at a second temperature greater than the first temperature range. The heat formable and heat reversible gelatinous elastomer material is over the permeable layer and fuses to the sealant layer within the first temperature range. The sealant layer and the gelatinous elastomer material adhere to each other through the permeable layer once the first temperature is attained. Thereby, the permeable layer secures to the gelatinous layer.

30 Claims, 3 Drawing Sheets

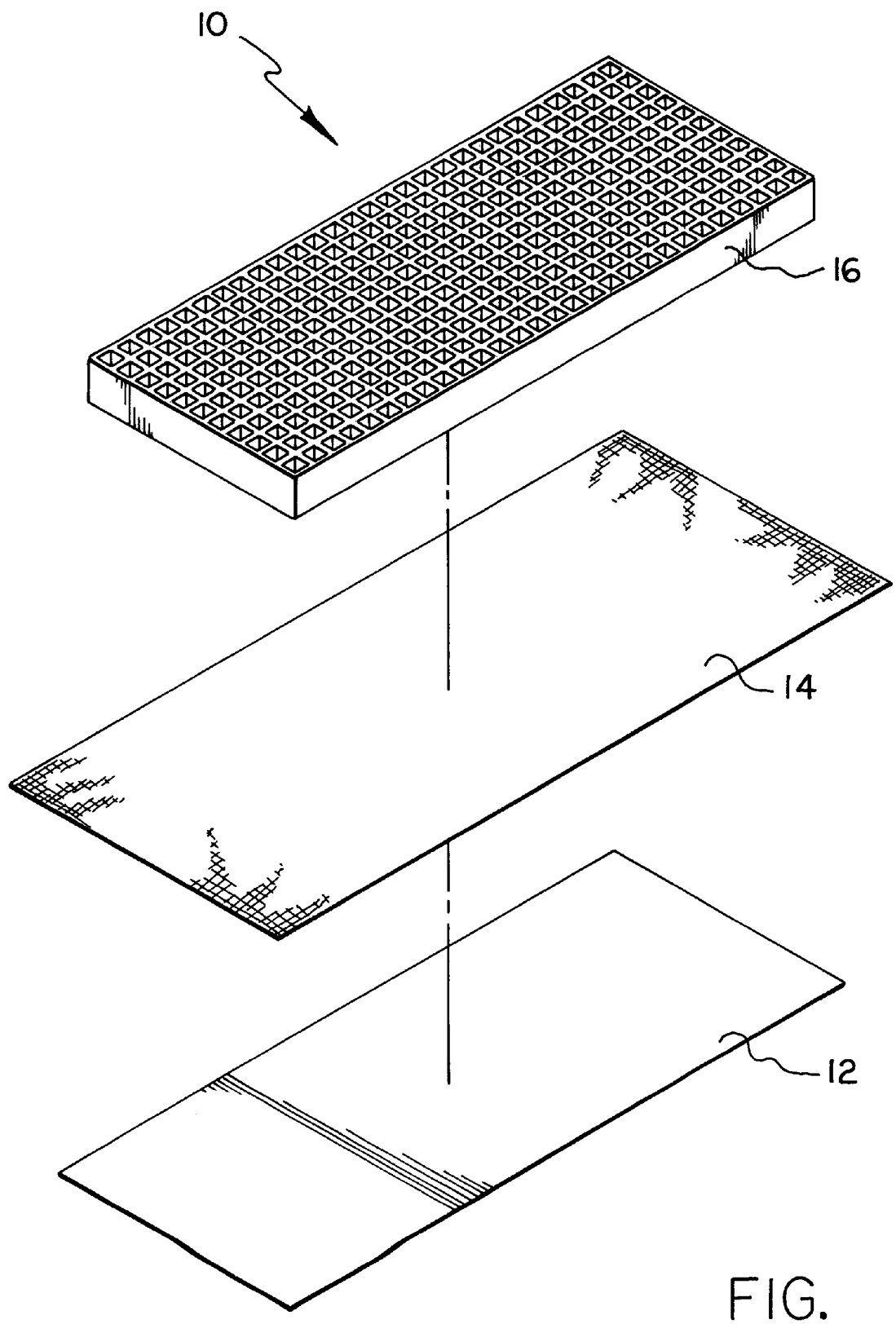

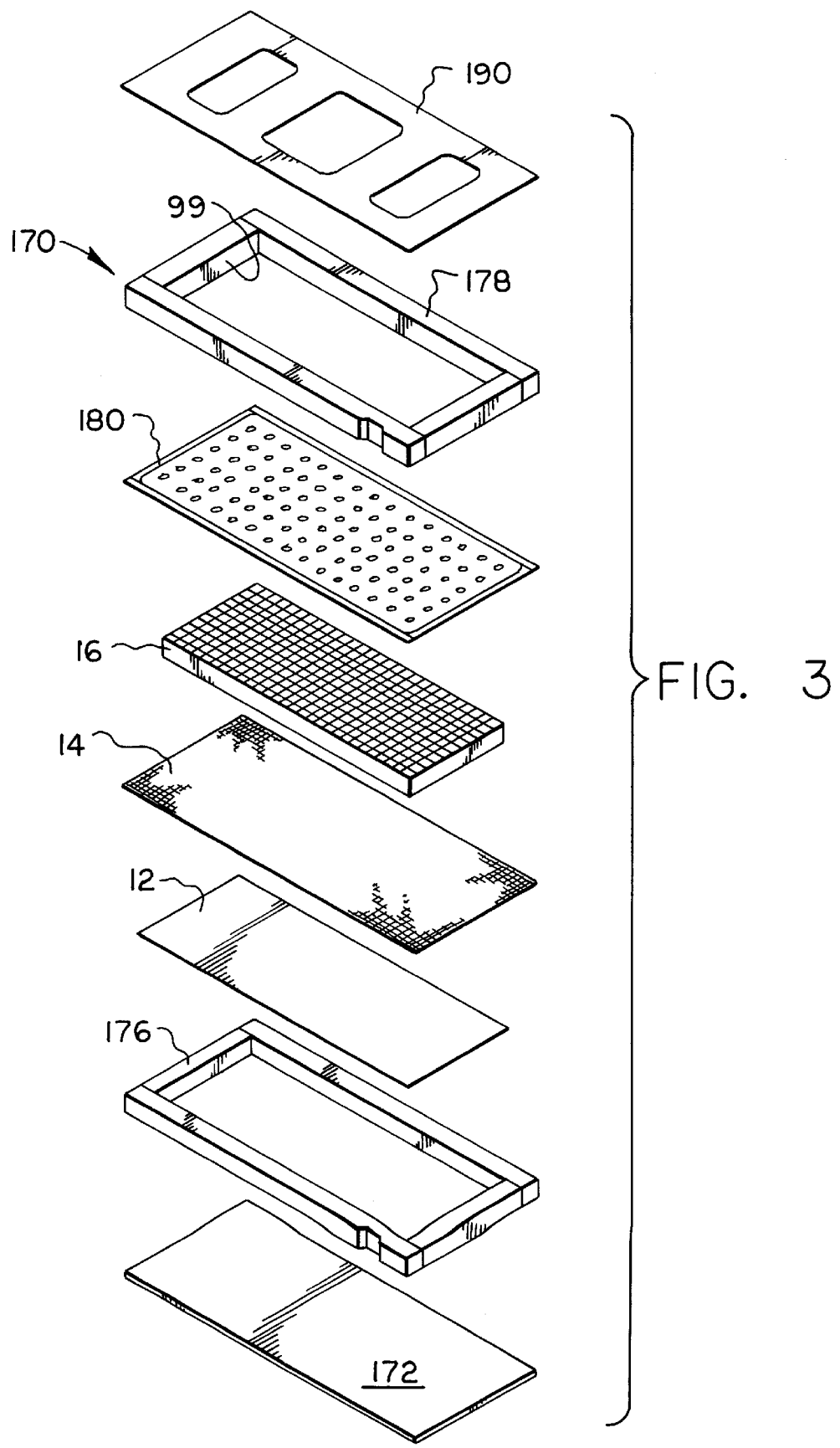

GELATINOUS COMPOSITE ARTICLE AND CONSTRUCTION

FIELD OF THE INVENTION

The present invention relates to useful gelatinous composite articles formed with a low rigidity gel.

BACKGROUND OF THE INVENTION

The gelatinous elastomer material used in the present invention is fully disclosed in U.S. Pat. Nos. 4,369,284, 4,618,213, 5,262,468, 5,336,708, and 5,508,334, (the inventor in each patent is Chen) which are hereby incorporated by reference herein. These patents disclose the various embodiments of the gelatinous elastomer material. This gel material has many attributes that are sufficiently set forth in the cited patents. However, the gel material has some problems. One such problem occurs when a parallel force is applied to the gel material. The parallel force pushes the gel material so it slides and gathers as a compressed state.

In U.S. Pat. No. 5,336,708, Chen discloses a gelatinous elastomer composite article. These articles, as disclosed by Chen, "include: GMG, MGM, $MG_1G_2M$, $M_1M_2G_1G_2$, $M_2M_1G_1G_2$, $G_1MG_1G_2$, $MG_1G_2$, $G_1G_2M$, $G_2G_1M$, $GM_1M_2G$, $G_1M_1G_2M_2M$, $M_1GM_2GM_3GM_4$, (sic) ect, where G=gel and M=material. The subscript 1, 2, 3, and 4 are different and is represented by n which is a positive number. The material (M) suitable for forming composite articles with the gelatinous elastomer compositions can include foam, plastic fabric, metal, concrete, wood, wire screen, refractory material, glass, synthetic resin, synthetic fibers, and the like. Sandwiches of gel/material . . . are ideal for use as shock absorbers, acoustical isolators, vibration dampers, vibration isolators and wrappers. For example the vibration isolators can be (sic) use under research microscopes, office equipment, tables, and the like to remove background vibrations." U.S. Pat. No. 5,336,708, col. 3, lines 35–51. Chen further discloses, "generally the molten gelatinous elastomer composition will adhere sufficiently to certain plastics (e.g. acrylic, ethylene copolymers, nylon, polybutylene, polycarbonate, polystyrene, polyester, polyethylene, polypropylene, styrene copolymers, and the like) provided the temperature of the molten gelatinous elastomer composition is (sic) sufficient high to fuse or nearly fuse with the plastic. In order to obtain sufficient adhesion to glass, ceramics, or certain metals, sufficient temperature is also required (e.g. above 250° F. [121° C.])." U.S. Pat. No. 5,336,708, col. 9, lines 8–18 (emphasis added and brackets added for consistency of temperature comparison).

Chen provides antecedent basis for the phrase "the molten gelatinous elastomer composition" by defining it as follows: "the gelatinous elastomer composition of the present invention are prepared by blending together the components including other additives as desired at about 23° C. (73.4° F.) to about 100° C. (212° F.) forming a paste like mixture and further heating said mixture uniformly to about 150° C. (302° F.) to about 200° C. (392° F.) until a homogeneous molten blend is obtained." U.S. Pat. No. 5,336,708, col. 6, lines 52–58 (parenthesis added for consistency of temperature comparison). As such, the term "molten" has the standard definition of "1 a obs: formed in a mold: cast b: fused or liquefied by heat: melted." Webster's Third New International Dictionary of the English Language Unabridged 1456 (1966). In other words, the process to fabricate the gelatinous elastomer composite article requires the gelatinous elastomer material be in a melted state and formed upon the material (M). The resulting product, as illustrated in FIGS. 2a–2d, is the gelatinous elastomer material, G, lying on or within the material, M. In no instance does the gelatinous elastomer material of Chen penetrate through a first material, $M_1$, to contact a second material, $M_2$, underlying the first material (M). Likewise Chen fails to disclose an underlying second material, $M_2$, that penetrates through a first material, $M_1$, to contact a gelatinous elastomer material.

A problem to solve is to fabricate a gelatinous composite article that is easy to use and stable for various uses, such as a mattress unit. The present invention solves this problem.

SUMMARY OF THE INVENTION

The gelatinous composite article of the present invention has a sealant layer, a permeable layer and a heat formable and heat reversible gelatinous elastomer material. The sealant layer melts within a first temperature range. The permeable layer is over the sealant layer and melts at a second temperature greater than the first temperature range. The heat formable and heat reversible gelatinous elastomer material is over the permeable layer and fuses to the sealant layer within the first temperature range. The sealant layer and the gelatinous elastomer material adhere to each other through the permeable layer once the first temperature is attained. Thereby, the permeable layer secures to the gelatinous layer.

BRIEF DESCRIPTION OF THE INVENTION

A preferred embodiment of the present invention is described in detail hereinafter with reference to the accompanying drawing, in which:

FIG. 1 is an exploded view of a gelatinous article;

FIGS. 2a–c are schematic views of the process; and

FIG. 3 is an exploded view of a gelatinous composite article in a mattress unit.

DETAILED DESCRIPTION OF THE INVENTION

Figure 2A:
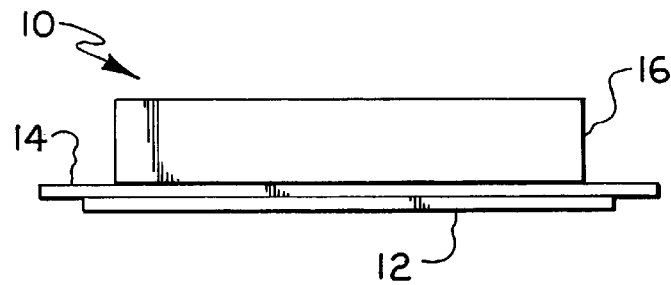

FIG. 1 illustrates a gelatinous composite article 10. Article 10 has a sealant layer 12, a permeable layer 14 and a heat formable and heat reversible gelatinous elastomer material 16. The gelatinous elastomer material 16 used in the present invention is fully disclosed in U.S. Pat. Nos. 4,369,284, 4,618,213, 5,262,468, 5,336,708, and 5,508,334, which are hereby incorporated by reference herein. The gelatinous elastomer material 16, without any material (M), is obtained from Applied Elastomerics, Incorporated of South San Francisco, Calif. Preferably, the material 16 is a lattice structure having a height ranging from about 1 cm to about 5 cm. The material 16 also has a high viscosity triblock copolymer of the general configuration poly(styrene-ethylene-butylenestyrene) and a gel rigidity of from about 20 to about 700 gram Bloom. The material 16 fuses to other surfaces at a first temperature range. The first temperature range is between 150° F. (65° C.) and 450° F. (232° C.), preferably 200° F. (93.3° C.) and 250° F. (121° C.). This material 16 by itself will go into the compressed state with any parallel force (F1).

To avoid the compressed state, the present invention uses the sealant layer 12 and permeable layer 14. The permeable layer 14 is between the sealant layer 12 and the material 16. Acceptable materials for the permeable layer 14 include polyester materials, non-woven nylon materials and any other similar materials. The permeable layer 14 provides the support to the material 16 to prevent the compressed state.

Preferably, the permeable layer 14 does not actually fuse with the material 16. Rather, the permeable layer 14 melts at a second temperature. The second temperature is greater than the first temperature range so the permeable layer 14, preferably, does not fuse to the material 16. Even though the permeable layer 14, preferably, does not fuse to the material 16 the permeable layer 14 is secured to the material 14 by the underlying sealant layer 12.

The sealant layer 12 fuses to the material 16 at a temperature within the first temperature range. The sealant material 12, when melted, permeates through the permeable layer 14 to essentially secure the layer 14 to the material 16. The inventors attempted to use various sealant materials such as Superglue™ and other conventional adhesives. Those adhesives, however, did not sufficiently secure the layer 14 to the material 16. Polyolefins such as polyethylene and other similar polymeric compositions when melted are sealant layer 12 materials that secure the layer 14 to the material 16, for example, by thermo-bonding.

Figure 2B:
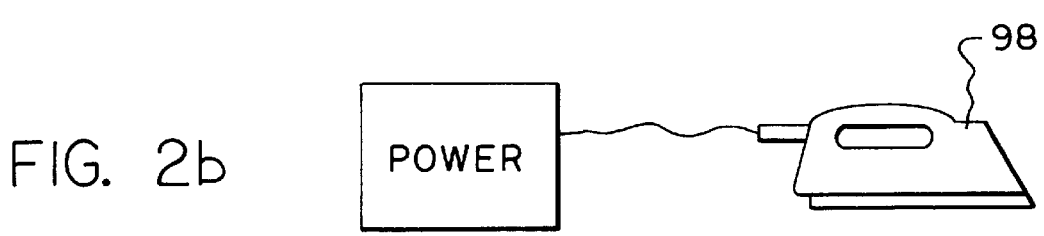
Figure 2C:
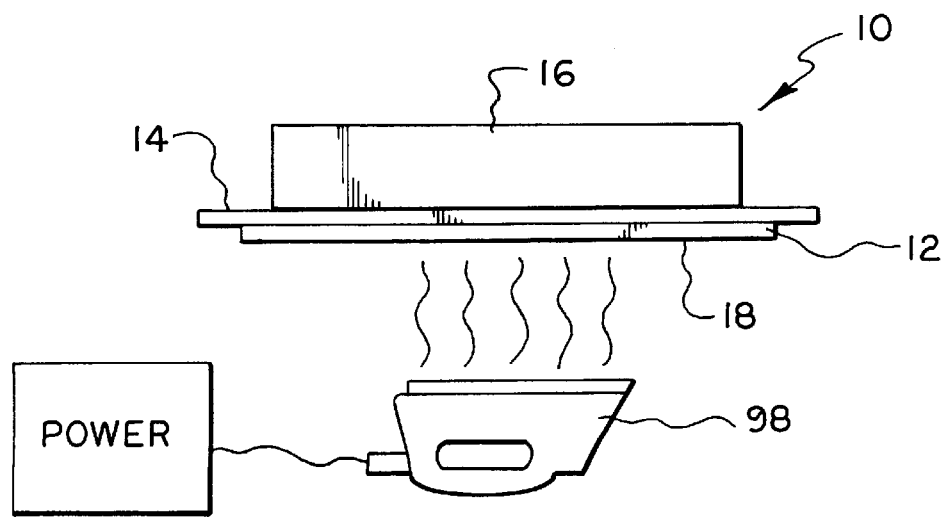

The gelatinous composite article 10 is manufactured in a three step process as shown in FIGS. 2a–c. The first step, as shown in FIG. 2a, entails arranging the elements 12, 14, and 16 in order. This order is as follows: the gelatinous elastomer material 16 is over the permeable layer 14 which is over the sealant layer 12; preferably, the gelatinous elastomer material 16 is on the permeable layer 14 which is on the sealant layer 12. The second step requires heating a heating element 98, such as an iron, within the first temperature range as shown in FIG. 2b. The third step, illustrated in FIG. 2c, entails applying the heated heating element to the underside 18 of the article 10. The heating element transfers sufficient heat to the sealant layer 12 that the sealant layer 12 melts. The melted sealant layer 12 penetrates through the permeable layer 14 without effecting the layer 14, such as by melting layer 14, and contacts the material 16. Upon contact the melted sealant layer 12 fuses with the material 16 by melting the underside 18 of the material 16.

Turning to FIG. 3, another embodiment of the present invention is illustrated. In this embodiment, the article 10 is used in a mattress unit such as the mattress unit identified as 170. The other components 172–190, excluding 180, of the mattress unit 170 are fully disclosed in U.S. Pat. No. 5,794,289 (Ser. No. 08/748,209), which is hereby incorporated by reference. Two of those components are an upper crib 178 and a lower crib 176. A conventional adhesive secures the upper crib 178 and the lower crib 176 together.

The area of the permeable layer 14 is greater than the area of the gelatinous elastomer material 16. Preferably, the gelatinous elastomer material 16 has a length and width equal to or less than the area encompassed by the inner perimeter 99 of the upper crib 178 so the material 16 fits within the crib 178. In contrast, the permeable layer 14 has a length and width greater than the area encompassed by the inner perimeter 99 of the crib 178. As for the position of the material 16 in relation to the layer 14, the perimeter of the gelatinous elastomer material 16 does not contact the periphery of the permeable layer 14. The periphery of the permeable layer 14, not the material 16, is securely attached between the adhesively connected upper crib 178 and lower crib 176. As such, the cribs 178, 176 secure the article 10 into place within the mattress unit 170.

The mattress unit 170 also comprises a mattress 180. Mattress 180 is any conventional mattress such as those made with springs, air, liquid, or gel. In any case, mattress 10 fits within the crib 178 and upon article 10. Article 10 prevents mattress 180 from sliding and also prevents decubitus ulcers from forming on bed-ridden individuals.

Although a particular preferred embodiment of the invention has been illustrated and described in detail for illustrative purposes, it will be recognized that variations or modifications of the disclosed apparatus, including the rearrangement of parts, lie within the scope of the invention defined by the claims.

The embodiments of the invention in which an exclusive property or privilege is claimed are defined as follows:

We claim:

1. A gelatinous composite article comprising:
    a sealant layer that melts within a first temperature range;
    a permeable layer over the sealant layer that melts at a second temperature greater than the first temperature range; and
    a heat formable and heat reversible gelatinous elastomer material over the permeable layer that fuses to the sealant layer within the first temperature range thereby securing the permeable layer to the gelatinous layer.

2. The gelatinous composite article of claim 1 wherein the permeable layer is selected from the group consisting of polyester and non-woven nylon.

3. The gelatinous composite article of claim 1 wherein the sealant layer is a polyolefin.

4. The gelatinous composite article of claim 1 wherein the gelatinous elastomer material comprises a high viscosity triblock copolymer of the general configuration poly (styrene-ethylene-butylene-styrene).

5. The gelatinous composite article of claim 1 wherein the first temperature range is between 250° and 450° F.

6. The gelatinous composite article of claim 1 wherein the area of the permeable layer is greater than the area of the gelatinous elastomer material.

7. A method of fabricating a gelatinous composite article comprising the steps of:
    arranging a sealant layer that melts within a first temperature range, under a permeable layer, that melts at a second temperature greater than the first temperature, and a heat formable and heat reversible gelatinous elastomer material over the permeable layer that melts within the first temperature range; and
    applying a heating element having a temperature within the first temperature range to the sealant layer so the sealant layer and gelatinous elastomer material fuse together to secure the permeable layer to the gelatinous layer.

8. The method of claim 7 wherein the permeable layer is selected from the group consisting of polyester and non-woven nylon.

9. The method of claim 7 wherein the sealant layer is a polyolefin.

10. The method of claim 7 wherein the gelatinous elastomer material comprises a high viscosity triblock copolymer of the general configuration poly(styrene-ethylene-butylene-styrene).

11. The method of claim 7 wherein the first temperature ranges between 250° and 450° F.

12. The method of claim 7 wherein the area of the permeable layer is greater than the area of the gelatinous elastomer material.

13. A gelatinous composite article in a mattress unit comprising:
    a foam crib in the mattress unit;
    a sealant layer that melts within a first temperature range;
    a permeable layer over the sealant layer that attaches to the foam crib and melts at a second temperature greater than the first temperature range;

a heat formable and heat reversible gelatinous elastomer material over the permeable layer that fuses to the sealant layer within the first temperature range thereby securing the permeable layer to the gelatinous layer.

14. The gelatinous composite article of claim 13 wherein the permeable layer is selected from the group consisting of polyester and non-woven nylon.

15. The gelatinous composite article of claim 13 wherein the sealant layer is a polyolefin.

16. The gelatinous composite article of claim 13 wherein the gelatinous elastomer material comprises a high viscosity triblock copolymer of the general configuration poly(styrene-ethylene-butylene-styrene).

17. The gelatinous composite article of claim 13 wherein the first temperature ranges between 250° and 450° F.

18. The gelatinous composite article of claim 13 wherein the area of the permeable layer is greater than the area of the gelatinous elastomer material.

19. The gelatinous composite article of claim 13 wherein the foam crib comprises an upper foam crib, a lower foam crib, and an adhesive material; the adhesive layer is between the upper and lower foam cribs, and attaches the permeable layer to the foam crib.

20. The gelatinous composite article of claim 13 wherein the foam crib is along the perimeter of the heat formable and heat reversible gelatinous elastomer material.

21. The gelatinous composite article of claim 13 wherein a gel mattress is over the gelatinous composite article.

22. A method of forming a gelatinous composite article in a mattress unit comprising the steps of:

arranging a sealant layer that melts within a first temperature range, under a permeable layer, that melts at a second temperature greater than the first temperature, and a heat formable and heat reversible gelatinous elastomer material over the permeable layer that melts within the first temperature range; and applying a heating element having a temperature within the first temperature range to the sealant layer so the sealant layer and gelatinous elastomer material fuse together to secure the permeable layer to the gelatinous layer; and attaching the permeable layer to a foam crib in the mattress unit.

23. The method of claim 22 wherein the permeable layer is selected from the group consisting of polyester and non-woven nylon.

24. The method of claim 22 wherein the sealant layer is a polyolefin.

25. The method of claim 22 wherein the gelatinous elastomer material comprises a high viscosity triblock copolymer of the general configuration poly(styrene-ethylene-butylene-styrene).

26. The method of claim 22 wherein the first temperature ranges between 250° and 450° F.

27. The method of claim 22 wherein the area of the permeable layer is greater than the area of the gelatinous elastomer material.

28. The method of claim 22 wherein the foam crib comprises an upper foam crib, a lower foam crib, and an adhesive material; the adhesive layer is between the upper and lower foam cribs, and attaches the permeable layer to the foam crib.

29. The method of claim 22 wherein the foam crib is along the perimeter of the heat formable and heat reversible gelatinous elastomer material.

30. The method of claim 22 wherein a gel mattress is over the gelatinous composite article.

* * * * *